June 29, 1926.  
A. J. CHAPIN  
VEHICLE WHEEL  
Original Filed Sept. 28, 1922
1,590,284
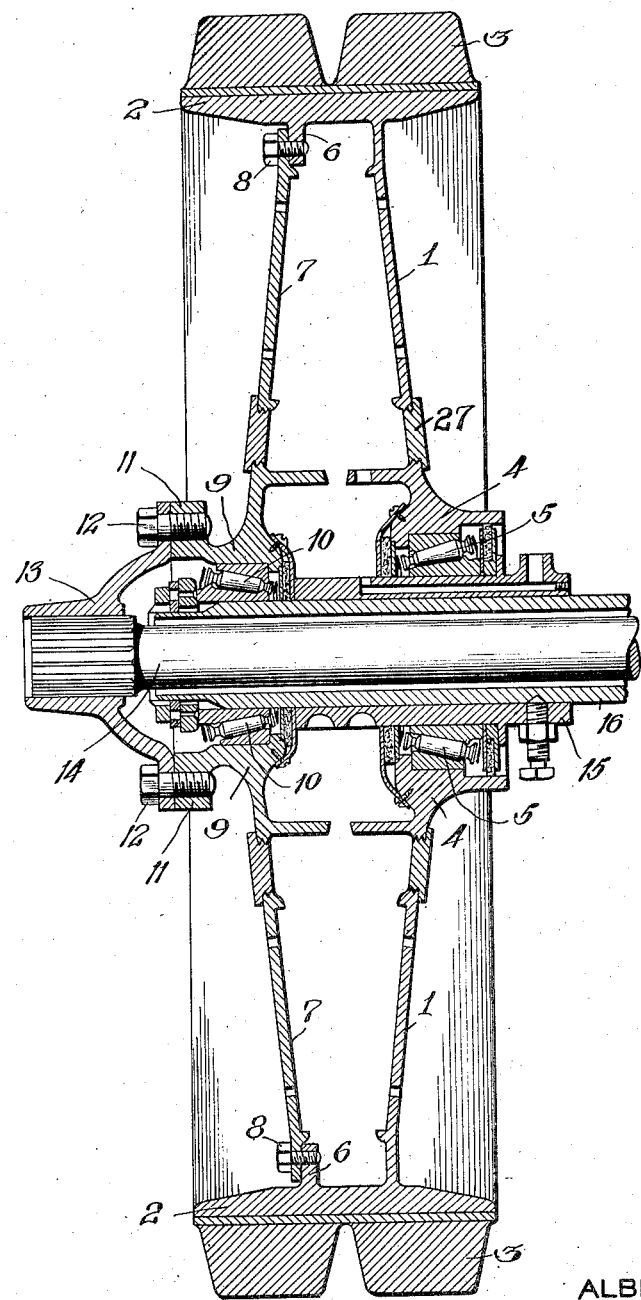
Inventor:  
ALBERT J. CHAPIN  
By Wm. M. Cady  
Attorney Patented June 29, 1926.

1,590,284

UNITED STATES PATENT OFFICE.

ALBERT J. CHAPIN, OF GLENDALE, CALIFORNIA, ASSIGNOR TO THE WESTINGHOUSE AIR BRAKE COMPANY, OF WILMERDING, PENNSYLVANIA, A CORPORATION OF PENNSYLVANIA.

VEHICLE WHEEL.

Original application filed September 28, 1922, Serial No. 591,201. Divided and this application filed February 17, 1923. Serial No. 619,748.

This invention relates to wheels, and more particularly to a wheel for a motor vehicle.

The principal object of my invention is to provide an improved motor vehicle wheel of the disk type.

This application is a division of my original application, Serial No. 591,201, filed September 28, 1922.

In the accompanying drawing, the single figure is a central sectional view of a vehicle wheel of the disk type embodying my invention.

As shown in the drawing, the construction may comprise a dished steel disk 1, having cast or formed integrally therewith an outer annular rim 2 which may be adapted to carry a solid tire 3, as shown in the drawing, or a pneumatic tire of the usual construction. Axially, a hub 4 is cast or formed integrally with the disk 1 and mounted in the hub is a wheel bearing 5, which may be the well known conical roller bearing, as shown in the drawing, or other desired type of bearing.

Spaced from the disk 1, the rim 2 is provided with an annular inwardly extending flange 6 and secured to said flange by bolts 8 is a dished steel disk 7. The disk 7 has cast or formed integrally therewith an axial hub 9 within which is mounted a roller bearing 10. In the case of a rear wheel construction, the hub 9 may be provided with an annular flange 11 to which is secured by bolts 12 a cap 13, said cap being constructed to engage on the fluted or keyed end of the corresponding rear drive shaft or axle 14. The wheel is mounted on a sleeve member 15 which is secured to the usual axle housing 16. In the case of a front wheel construction, the wheel is applied to the usual front wheel steering knuckle stub shaft.

By constructing the disk wheel in two sections each disk may be cast or formed integral with a corresponding hub, thus obviating the use of loose or bolted connections between the hub and the disks.

Having now described my invention, what I claim as new and desire to secure by Letters Patent, is:—

A vehicle wheel comprising an integral rim section, a disk integral with said rim section, an inwardly extending annular flange integral with said rim and spaced from said disk, a disk having its annular periphery secured to said flange, and a hub formed integral with each disk, said hubs being spaced apart.

In testimony whereof I have hereunto set my hand.

ALBERT J. CHAPIN.